United States Patent
White (10) Patent No.: US 10,807,723 B2
(45) Date of Patent: Oct. 20, 2020

(54) INTEGRATED LIQUID HEAT EXCHANGER AND OUTFLOW VALVE SYSTEMS AND METHODS

(71) Applicant: The Boeing Company, Chicago, IL (US)

(72) Inventor: Jeffrey Joseph White, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 172 days.

(21) Appl. No.: 16/179,830

(22) Filed: Nov. 2, 2018

(65) Prior Publication Data
US 2020/0140094 A1 May 7, 2020

(51) Int. Cl.
| | | |
|---|---|---|
| B64D 13/08 | (2006.01) | |
| F28D 1/047 | (2006.01) | |
| F28F 27/00 | (2006.01) | |
| F28D 21/00 | (2006.01) | |

(52) U.S. Cl.
CPC ........... B64D 13/08 (2013.01); F28D 1/0472 (2013.01); F28F 27/00 (2013.01); F28D 2021/0021 (2013.01); F28D 2021/0031 (2013.01)

(58) Field of Classification Search
CPC .................... B64D 13/08; F28D 1/0472; F28D 2021/0021; F28D 2021/0031; F28F 27/00
See application file for complete search history.

(56) References Cited

U.S. PATENT DOCUMENTS

| | | | | |
|---|---|---|---|---|
| 2,249,948 A * | 7/1941 | Dornier | ................. | B64D 33/12 |
| | | | | 244/57 |
| 3,426,984 A | 2/1969 | Emmons | | |
| 3,544,045 A | 12/1970 | Butscher | | |
| 4,674,704 A * | 6/1987 | Altoz | ................. | H05K 7/20136 |
| | | | | 244/1 R |
| 2004/0216792 A1* | 11/2004 | Bunn | .................... | B64D 13/04 |
| | | | | 137/899.2 |
| 2004/0217317 A1* | 11/2004 | Bunn | .................... | F16K 1/2007 |
| | | | | 251/301 |
| 2008/0087039 A1* | 4/2008 | Reed | ........................ | B60H 1/32 |
| | | | | 62/498 |

(Continued)

FOREIGN PATENT DOCUMENTS

| | | | |
|---|---|---|---|
| CN | 105366028 A | * | 3/2016 |
| CN | 105416591 A | * | 3/2016 |

(Continued)

*Primary Examiner* — Devon Russell
(74) *Attorney, Agent, or Firm* — Haynes and Boone, LLP (57) ABSTRACT

An aircraft outflow valve with a heat exchanger is disclosed herein. The aircraft outflow valve can include a heat exchanger that includes an air flow path. Air can flow through the air flow path and exit the outflow valve through an opening at the end of the air flow path. Such airflow can regulate the internal pressure of the aircraft and can also dissipate heat from the outflow valve. The outflow valve can further include a liquid coolant flow path. The liquid coolant flow path can be coupled to liquid coolant lines of electronics of the aircraft. Thus, heat from the electronics of the aircraft can be dissipated through heat transfer between the coolant and the outflow valve, which is accordingly cooled by the airflow through the heat exchanger.

20 Claims, 9 Drawing Sheets

(56) References Cited

U.S. PATENT DOCUMENTS

| | | | | |
|---|---|---|---|---|
| 2010/0132915 A1* | 6/2010 | Blanding | ............... | B64D 47/00 |
| | | | | 165/41 |
| 2010/0258275 A1* | 10/2010 | Koenig | .................... | F28F 1/24 |
| | | | | 165/95 |
| 2011/0186263 A1* | 8/2011 | Piesker | ................. | B64D 13/00 |
| | | | | 165/47 |
| 2015/0027676 A1* | 1/2015 | Eilken | .................... | B64D 33/10 |
| | | | | 165/168 |
| 2016/0159466 A1* | 6/2016 | Daggett | ............... | B64C 23/005 |
| | | | | 244/87 |
| 2019/0389586 A1* | 12/2019 | Army | ................... | F28F 9/0275 |

FOREIGN PATENT DOCUMENTS

| | | | | |
|---|---|---|---|---|
| FR | 3022019 A1 | * | 12/2015 | ............. B64D 33/12 |
| JP | 2004027988 A | * | 1/2004 | ................ F28F 3/12 |

* cited by examiner

INTEGRATED LIQUID HEAT EXCHANGER AND OUTFLOW VALVE SYSTEMS AND METHODS

TECHNICAL FIELD

The disclosure relates generally to aircrafts and more specifically to aircraft outflow valves.

BACKGROUND

Modern aircraft often include electronic systems for control and operation of the aircraft as well as for entertainment of passengers. Such electronic systems generate waste heat. Typically, for lower power electronic systems, such waste heat can be dissipated through air cooling by exhausting the waste heat near an outflow valve of the aircraft to be drawn overboard. Electronic systems that produce higher amounts of heat can utilize dedicated liquid cooling systems within the electronics bay. Such liquid cooling systems typically produce waste heat that is exhausted to the air conditioning pack bay. Such systems or combination of systems require long cooling system lines and large fans to provide adequate cooling. Such lines and fans are heavy, expensive, and require significant time to manufacture, install, and maintain.

SUMMARY

Systems and methods are disclosed for an aircraft outflow valve. The aircraft outflow valve can include a base configured to be coupled to a portion of an aircraft, a heat exchanger coupled to the base and including an air flow path, and a valve coupled to the base body. The base can include a base body and a coolant portion disposed within the base body and including a liquid coolant flow path. The valve can include an open disposed at an end of the air flow path and a valve body configured to move between an open position and a closed position. The open position can be configured to allow air to flow through the opening and the closed position can be configured to block air from flowing through the opening In another example, a method can be disclosed. The method can include causing a fluid to flow through a liquid coolant flow path of a coolant portion of a base of an aircraft outflow valve, where the base is coupled to a heat exchanger comprising an air flow path, determining a desired valve position of a valve body configured to move between an open position allowing air to flow through the air flow path and through an opening of the aircraft outflow valve and a closed position preventing air from flowing through the opening of the aircraft outflow valve, and moving the valve body to the desired valve position.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of aircraft outflow valves and methods of operations thereof are described herein. Such an outflow valve can include a base configured to be coupled to a portion of an aircraft, a heat exchanger coupled to the base, and a valve. The base can include a base body and a coolant portion disposed within the base body. The coolant portion can include a liquid coolant flow path. The heat exchanger can include an air flow path and the valve can include an opening and a valve body configured to move between an open position and a closed position. The open position can be configured to allow air to flow through the opening and the closed position can be configured to block air from flowing through the opening. Such an outflow valve, and techniques for operating thereof, will be described herein.

Figure 1:
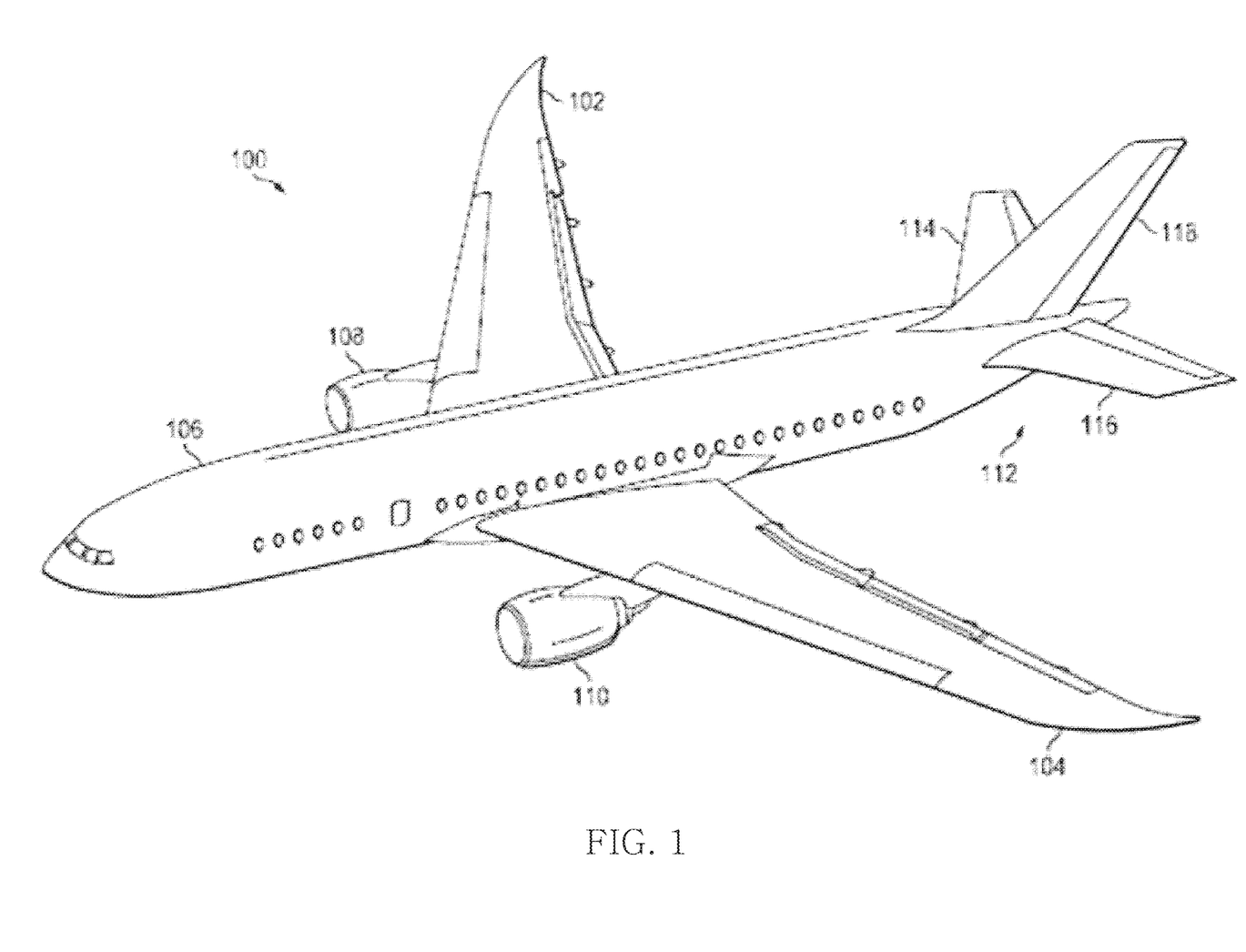
FIG. 1 illustrates an aircraft in accordance with an example of the disclosure.

FIG. 1 illustrates an aircraft in accordance with an example of the disclosure. Aircraft 100 includes wing 102 and wing 104 attached to fuselage 106. Aircraft 100 further includes aircraft propulsor 108 attached to wing 102 and aircraft propulsor 110 attached to wing 104. Aircraft 100 also includes tail section 112. Horizontal stabilizer 114, horizontal stabilizer 116, and vertical stabilizer 118 are attached to tail section 112. Portions of aircraft 100 can include outflow valves for regulation of interior pressure (e.g., cabin pressure) of aircraft 100. Such outflow valve can be disposed on, for example, fuselage 106 of aircraft 100.

Aircraft 100 can include electronic systems that generate waste heat. The electronic systems can be air cooled as well as, in certain examples, liquid cooled. The liquid cooled electronic systems can include coolant lines that allow for the flow of coolant within the lines. The coolant can be circulated within the lines to draw heat from the electronics which increases the temperature of the coolant. The coolant can then flow to a heat exchanger to transfer the heat to the heat exchanger for dissipation. Transferring heat to the heat exchanger will decrease the temperature of the coolant. The coolant can then return to the electronics to draw further heat from the electronics. Thus, the heat exchanger can be coupled to a liquid cooling circuit of aircraft 100.

While aircraft 100 is a fixed wing aircraft, in other illustrative examples, aircraft 100 can be some other type of aircraft such as a helicopter or other vertical or short vertical take-off and landing vehicles, a spacecraft, a drone, and/or another type of vehicle.

Figure 2:
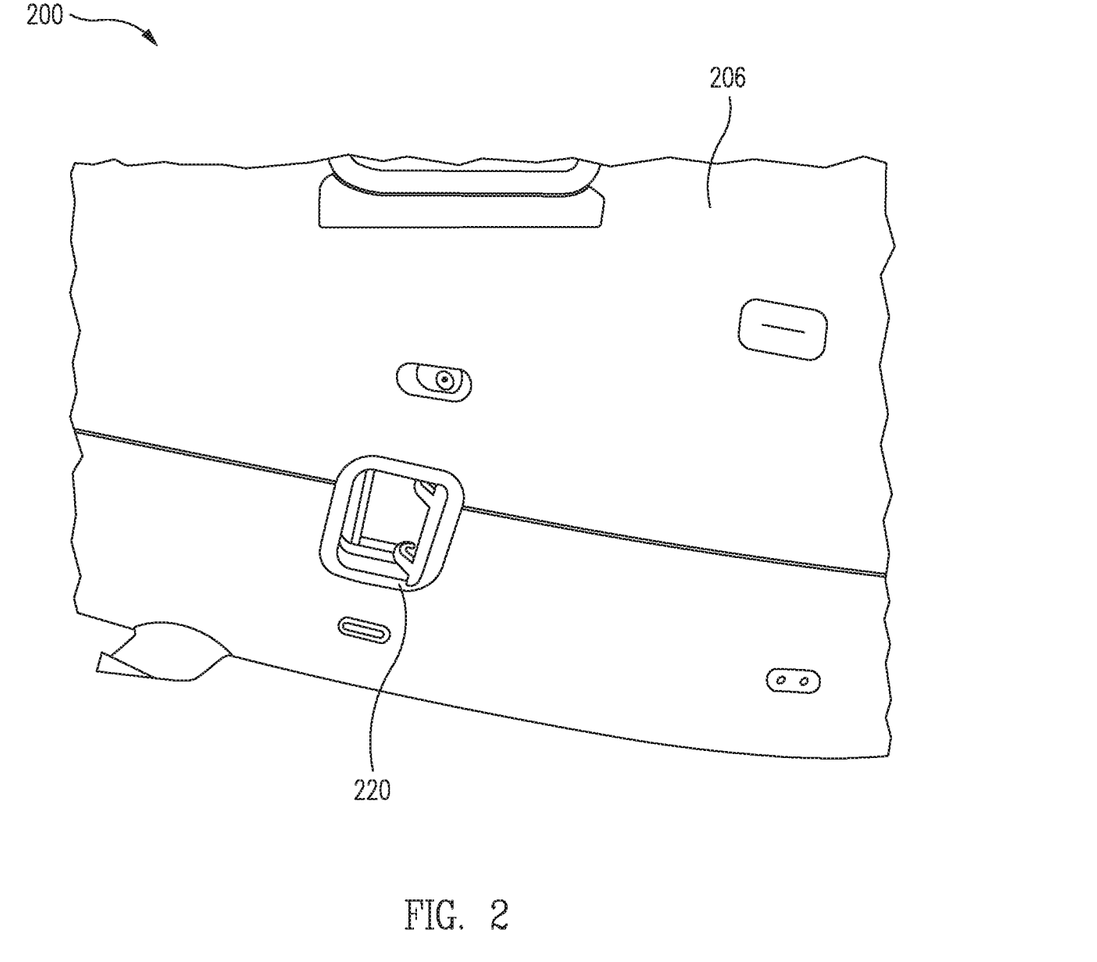
FIG. 2 illustrates an aircraft outflow valve in accordance with an example of the disclosure.

FIG. 2 illustrates an aircraft outflow valve in accordance with an example of the disclosure. FIG. 2 illustrates aircraft 200 with outflow valve 220. Outflow valve 220 can be coupled to fuselage 206 of aircraft 200. Outflow valve 220 can include features as described herein, including coolant flow paths and a heat exchanger.

Air from within the interior of aircraft 200 can exit through outflow valve 220. As such, outflow valve 220 can regulate the interior pressure of aircraft 200 (e.g., can regulate, for example, the interior cabin pressure of aircraft 200) by opening or closing as needed to build up or release pressure within aircraft 200.

In certain example, outflow valve 220 can be disposed close to the electronics bay of aircraft 200 or close to electronics with liquid cooling systems. As outflow valve 220 includes liquid coolant flow paths configured to couple coolant lines of the liquid cooling systems, disposing outflow valve 220 close (e.g., within a distance of 25% or less than the length of the fuselage) to such electronics or electronic bays can allow for a reduction in the length of coolant lines of aircraft 200 and, thus, reduce the weight of aircraft 200. In certain examples, the coolant can be any type of coolant used within liquid coolant systems for electronics.

Figure 3:
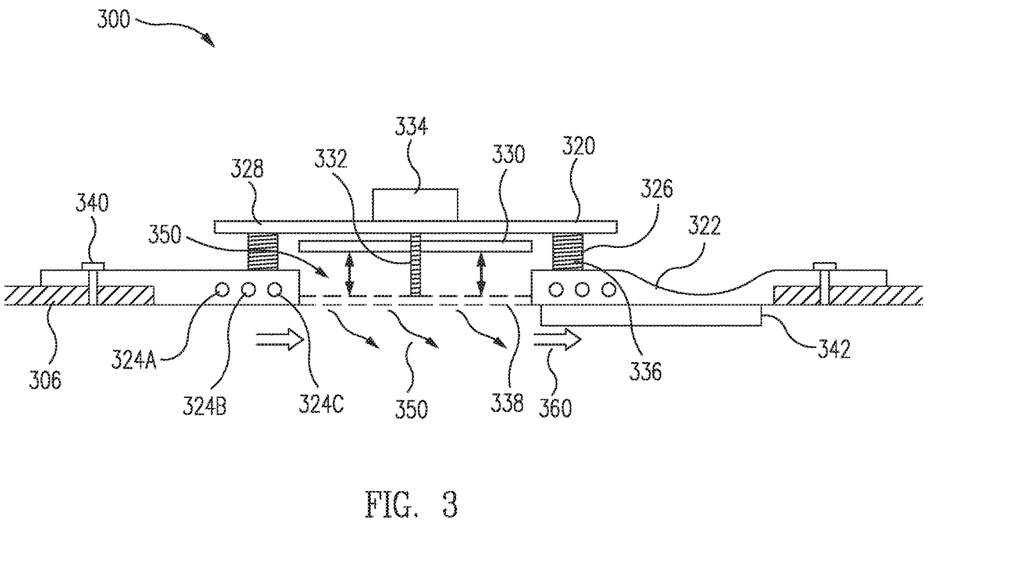
FIG. 3 illustrates a cutaway side view of an integrated heat exchanger aircraft outflow valve in accordance with an example of the disclosure.

Such an outflow valve is further described herein. For example, FIG. 3 illustrates a cutaway side view of an integrated heat exchanger aircraft outflow valve in accordance with an example of the disclosure. FIG. 3 illustrates outflow valve 300. Outflow valve 300 can include a heat exchanger 320, a base, and valve 330.

The base can include base body 322 and a coolant portion that includes liquid coolant flow paths 324A-C. Base body 322 can be configured to be coupled to fuselage 306 via rivets 340 or another such coupling technique (e.g., welding, brazing, adhesives, other types of fasteners and/or mechanical attachment techniques, or other such techniques). In certain examples, base body 322 can be configured to be removable from the fuselage 306 for maintenance. Certain such examples can allow for reinstallation of outflow valve 300 after maintenance. Base body 322 can be made from any appropriate material such as aluminum, copper, steel, titanium, carbon fiber, or another such material. In certain examples, base body 322 can be at least partially made from materials that include a high thermal conductivity to allow for dissipation of heat from the coolant within liquid coolant flow paths 324A-C.

Liquid coolant flow paths 324A-C can be disposed within a coolant portion of the base. The coolant portion can be a portion of the base and/or outflow valve 300 that includes liquid coolant flow paths as well as areas adjacent the liquid coolant flow paths.

Liquid coolant flow paths 324A-C can be coupled to one or more coolant lines for cooling of the electronics of the aircraft. When coupled, coolant from the electronics can flow through liquid coolant flow paths 324A-C. Such coolant can, thus, contact base body 322, which defines the perimeter of liquid coolant flow paths 324A-C, and transfer heat between the coolant and base body 322 (e.g., if there is a temperature difference between the coolant and base body 322). In certain examples, base body 322 can be at a lower temperature than the coolant and, thus, the coolant will be cooled when flowed through liquid coolant flow paths 324A-C through conduction.

Base body 322 can be thermally coupled to heat exchanger 320. Heat can accordingly be conducted between heat exchanger 320 and base body 322. Heat exchanger 320 can be cooled by airflow. Such airflow can dissipate heat from heat exchanger 320 and lower the temperature of heat exchanger 320 and, accordingly, base body 322. Heat exchanger 320 can include fins 326 and cover 328. Fins 326 and cover 328 can define at least portions of air flow paths 336 of heat exchanger 320. As shown in FIG. 3, base body 322 can also define a portion of air flow paths 336. Thus, as shown, base body 322, fins 326, and cover 328 can define portions of the perimeter of air flow paths 336.

Such air flow paths 336 can be configured to allow for airflow 350 within air flow paths 336. Airflow 350 can exit air flow paths 336 through opening 338. Opening 338 can be disposed on an end of air flow paths 336. In certain examples, air exiting opening 338 can flow into the ambient environment around the aircraft. Airflow 350 within air flow paths 336 can cool base body 322, fins 326, and cover 328 thereby removing heat from the outflow valve 300. In certain examples, fins 326 and cover 328 can be thermally coupled to base body 322 and, accordingly, allow for additional cooling of base body 322 from conduction.

The rate of cooling by air flow paths 336 can be dependent upon the volume of airflow 350 within the air flow paths 336. A greater volume of airflow 350 within air flow paths 336 can allow for greater conduction and convection cooling of base body 322, fins 326, and cover 328 and, thus, greater cooling of any coolant within liquid coolant flow paths 324A-D. Conversing, restricting the volume of airflow 350 within air flow paths 336 can result in less cooling.

The volume of airflow 350 within air flow paths 336 can be controlled by valve 330. Valve 330 can be configured to move between at least an open position and a closed position. The open position can allow for airflow through opening 338 while the closed position can prevent airflow through opening 338. When valve 330 is in the open position, airflow 350 can, accordingly, flow through opening 338 and, thus, aid in cooling of coolant within liquid coolant flow paths 324A-C as well as allow for adjustment of (e.g., decrease) air pressure within the interior of the aircraft. In certain other examples, valve 330 can move to positions additional to the open and closed positions such as intermediate positions between the open and closed positions.

The position of valve 330 can be controlled by a pressure regulator that includes motor 334 and/or actuator 332. In certain examples, motor 334 can provide motion to move valve 330 through a plurality of positions. Such motion can be transferred to valve 330 through actuator 332. In other examples, actuator 332 can be configured to directly move valve 330 through a plurality of positions. Furthermore, though the example shown in FIG. 3 illustrates a valve 330 that can translate through a plurality of positions, other examples of the valve can, additionally or alternatively, rotate through a plurality of positions.

As described herein, outflow valve 300 can be coupled to other portions of fuselage 306. In certain examples, outflow valve can include an air flow path and/or liquid coolant flow path configuration that maintains the highest temperature portions of the outflow valve away from where the outflow valve couples to the aircraft skin. Thus, for example, liquid coolant flow paths 324A-D can be located centrally on outflow valve 300 (e.g., liquid coolant flow paths 324A-D can be located in the half of base 322 closer to opening 338), away from the edges of outflow valve 300. Furthermore, heat exchanger 320 can also be located centrally on outflow valve 300. Such a configuration can centralize the highest temperature portions of outflow valve 300 to prevent excessive heat transfer to, for example, fuselage 306. Especially for configurations of fuselages that are composite, centralization of heat can prevent excessive heat transfer to the fuselage and, thus, improve aircraft reliability and performance.

At least a portion of base body 322 can be disposed on and/or form an outer surface of fuselage 306. As such, base 322 can include fins 342. Fins 342 can be cooling fins configured to be disposed on a side of base body 322 opposite the side where fins 326 couple to base body 322. Thus, fins 342 can protrude from an outer surface of the fuselage 306 and be disposed within the outer air stream of the aircraft to allow for additional cooling of base body 322 by airflow 360 on the outer surface of fuselage 306. Accordingly, fins 342 can allow for additional cooling of base body 322 and, thus, the coolant within liquid coolant flow paths 324A-C.

In certain other examples, base body 322 can lack fins. However, as airflow 360 still passes over the exterior surface of base body 322, airflow 360 can still provide additional cooling to base body 322. Such cooling of base body 322 can further cool the coolant within liquid coolant flow paths 324A-C. As such, disposing liquid coolant flow paths 324A-C within base body 322 can allow for liquid coolant flow paths 324A-C to be disposed closer to the exterior of the aircraft and, accordingly, greater benefit from cooling by airflow 360. In certain examples, base body 322 can be shaped in various manners depending on the application, materials used, and thermal mass requirements. For example, FIG. 3 illustrates a configuration, where the left side of base body 322 illustrates an implementation which includes greater thermal mass than that of an implementation illustrated on the right side of base body 322. Accordingly, the left side can include a greater thermal mass and can accommodate short thermal transients without having large temperature spikes. The right side can be of a lower thermal mass for lower weight.

Airflow 360 on the outer surface of fuselage 306 can create a low pressure region on the outer surface of fuselage 306. Such a low pressure region can aid in the extraction of airflow 350 through air flow paths 336 and, accordingly, accelerate airflow 350.

Figure 4:
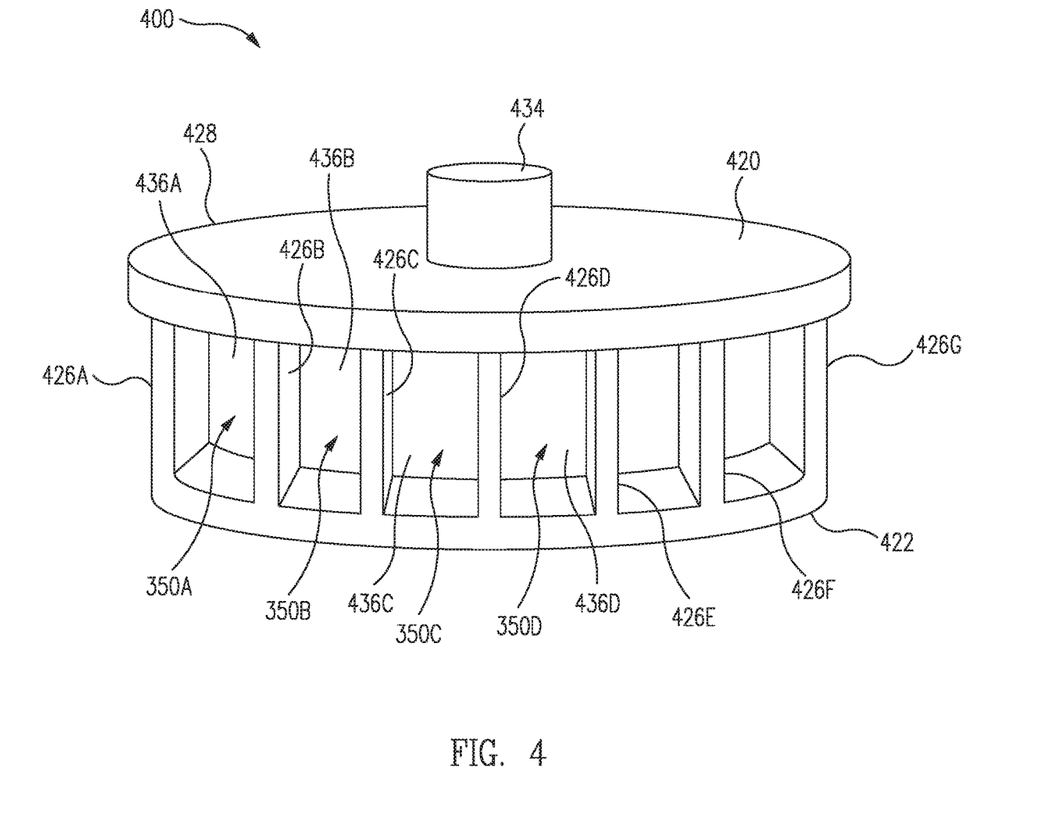
FIG. 4 illustrates a view of an integrated heat exchanger of an aircraft outflow valve in accordance with an example of the disclosure.

FIG. 4 illustrates a view of an integrated heat exchanger of an aircraft outflow valve in accordance with an example of the disclosure. FIG. 4 illustrates portions of outflow valve 400 including heat exchanger 420 coupled with motor 434. An actuator and/or a valve can be disposed within heat exchanger 420, but is not visible in the view of FIG. 4.

Heat exchanger 420 can include fins 426A-G, cover 428, and base 422. Though heat exchanger 320 in FIG. 3 can include fins 326 that are coupled to base body 322, heat exchanger 420 illustrated in FIG. 4 can include a separate base 422. Such a base 422 can be coupled (e.g., via welding, mechanical fasteners, adhesives, or other techniques as described herein) to an additional base (e.g., base body 322) that mounts to a fuselage of an aircraft.

Fins 426A-G, cover 428, and base 422 can define a plurality of air flow paths 436A-D and other air flow paths. The air flow paths 436A-D can allow for airflow 350A-D within the paths. Such airflow can be used to cool fins 426A-G, cover 428, and/or base 422. Cooling of fins 426A-G, cover 428, and/or base 422 can also, through conduction, cool liquid coolant flow paths disposed within base 422 or another base coupled to base 422.

As shown in FIG. 4, air flow paths 436A-D are arranged radially around motor 434. Thus, airflow 350A-D can enter heat exchanger 420 from substantially the entire perimeter of heat exchanger 420. Other heat exchangers can have other configurations. Thus, for example, other heat exchangers can be a rectangular shape and air can enter the heat exchanger through one or more sides of the rectangle. In another example, a heat exchanger can be a hexagonal shape and air can enter through one or more sides of the hexagon.

Thus, outflow valves described herein can include heat exchangers that can be a variety of shapes, each of which can include air flow paths that allows for heat exchange between the outflow valve and airflow within the air flow paths. Airflow within the heat exchanger and/or through the outflow valve can be controlled by one or more valves operated by one or more motors, such as motor 434. Motor 434 can move the valve between a plurality of positions, at least one of the positions allowing for airflow through the heat exchanger and/or the outflow valve, and at least another of the positions preventing airflow through the heat exchanger and/or the outflow valve.

Figure 5A:
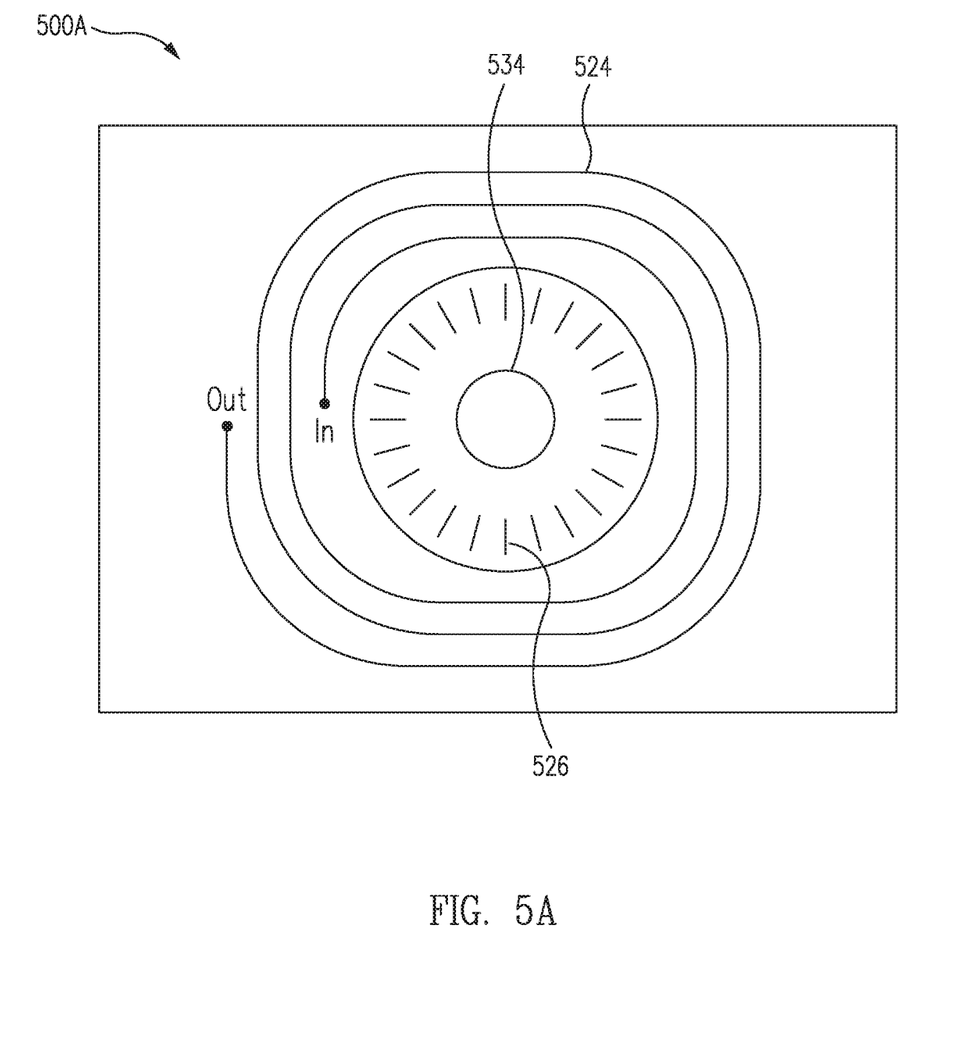
FIGS. 5A and 5B illustrate schematic top views of portions of integrated heat exchanger aircraft outflow valves in accordance with examples of the disclosure.
Figure 5B:
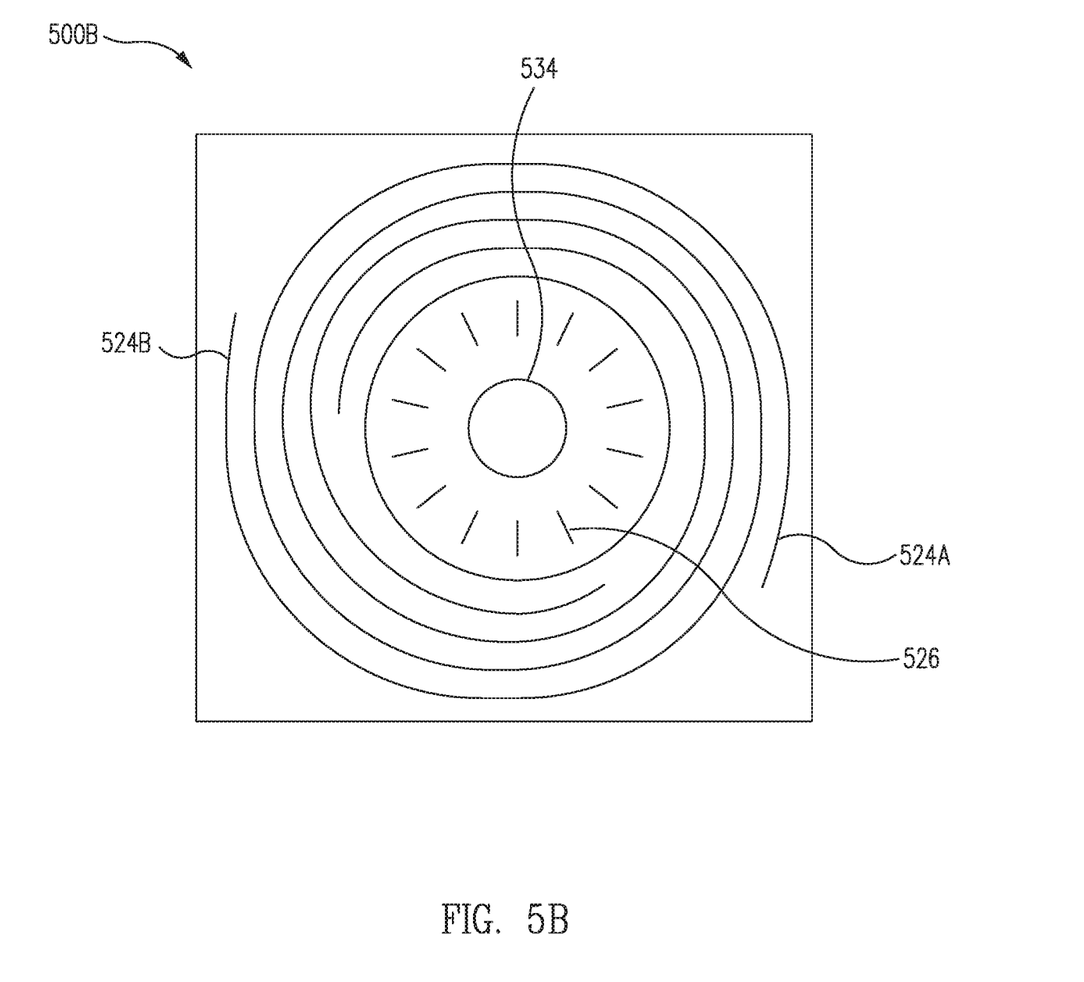

FIGS. 5A and 5B illustrate schematic top views of portions of integrated heat exchanger aircraft outflow valves in accordance with examples of the disclosure. FIGS. 5A and 5B illustrate different configurations of liquid coolant flow paths within an outflow valve.

FIG. 5A illustrates outflow valve 500A with liquid coolant flow path 524. Liquid coolant flow path 524 of outflow valve 500A can be a substantially circular or spiral shape to maximize the volume of coolant within liquid coolant flow path 524 and, thus, provide greater heat transfer between the coolant and outflow valve 400A. Thus, liquid coolant flow path 524 may wrap around itself a plurality of times. Alternatively, the cooling channels in coolant flow path 524 may be arranged in other patterns to conform to variations in the outflow valve 300 geometry.

While the example shown in FIG. 5A illustrates liquid coolant flow path 524 disposed outside of the area where fins 526 are mounted on a heat exchanger, other examples can dispose at least a portion of the liquid coolant flow path under or through the area where fins 526 are mounted (e.g., the liquid coolant flow path can be disposed underneath the and/or through the fins, as on a radiator).

In the example of FIG. 5A, liquid coolant flow path 524 can include an inlet and an outlet for the coolant. The outlet for the coolant can be disposed on a portion of the outflow valve exterior to the inlet. Thus, for example, when liquid coolant flow path 524 is in a spiral configuration as shown in FIG. 5A, the inlet can be disposed closer to a center point of the heat exchanger. By contrast, the outlet can be disposed farther away from the center point of the heat exchanger. Such a configuration can minimize hot spots within the outflow valve as the inlet of the liquid coolant flow path 524, which is typically the portion of liquid coolant flow path 524 with the highest temperature, is disposed toward the center of the base or another portion of the outflow valve, allowing for a large amount of thermal mass to be disposed around the inlet to absorb the heat. Furthermore, such a configuration can concentrate heat within a center of the outflow valve, away from the fuselage.

FIG. 5B illustrates outflow valve 500B with a plurality of liquid coolant flow paths 524A and 524B. The plurality of liquid coolant flow paths 524A and 524B can be a spiral or other shape. In certain examples, the inlets of liquid coolant flow paths 524A and 524B can be disposed a sufficient distance apart to prevent hotspots.

Figure 6:
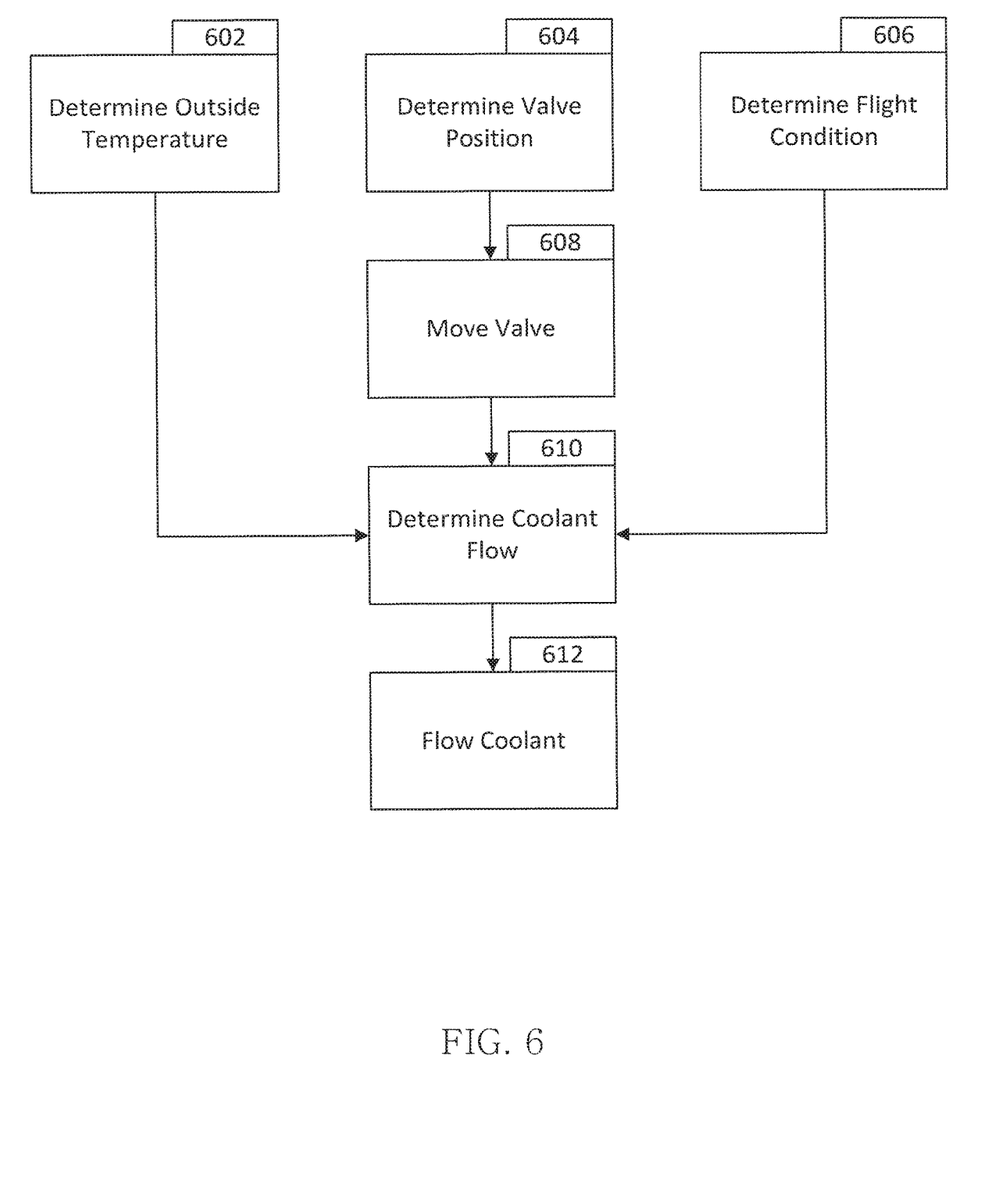
FIG. 6 is a block diagram detailing a process of operating an integrated heat exchanger aircraft outflow valve in accordance with an example of the disclosure.

FIG. 6 is a block diagram detailing a process of operating an integrated heat exchanger aircraft outflow valve in accordance with an example of the disclosure. FIG. 6 can illustrate a process of operating an integrated heat exchanger aircraft outflow valve disposed on an aircraft. The aircraft outflow valve can include one or more flow paths coupled to a liquid cooling system of the electronics of the aircraft.

The aircraft (e.g., aircraft 100 of FIG. 1) can include a controller and one or more sensors. The sensors can include an outside temperature sensor. The controller can be further configured to determine a flight condition (e.g., cruise, taxi, take-off, landing, or another condition) of the aircraft.

In block 602, the outside temperature sensor can determine an outside temperature of the aircraft (e.g., the ambient temperature exterior to the aircraft). In block 606, the flight condition of the aircraft can be determined.

In block 604, a position of the outflow valve (e.g., open, closed, partially open) can be determined. The position of the outflow valve can be determined by one or more sensors mounted on the outflow valve and/or, as the controller can provide commands to the outflow valve, through the last known position command provided by the controller to the outflow valve.

In block 608, the controller can provide position instructions to the outflow valve. Thus, the controller can provide instructions that adjust the position of the outflow valve. In certain examples, the aircraft can be pressurized and the position of the outflow valve can be adjusted to regulate the interior pressure of the aircraft (e.g., opened to decrease the interior pressure or closed to increase the interior pressure). Certain examples can also adjust the position of the outflow valve in response to airflow requirements through the heat exchanger. In such an example, the settings of the pressurization systems of the aircraft can accordingly be adjusted to maintain the interior pressure of the aircraft at a desired level.

In block 610, the controller can utilize data associated with the outside temperature, the flight condition, and the current outflow valve position to determine an amount of coolant flow to provide to the outflow valve. In certain configurations and conditions, the heat exchanger can dissipate a first amount of heat, while other configurations and conditions can allow for the heat exchanger to dissipate a second amount of heat. The coolant flow can accordingly be adjusted to dissipate a desired amount of heat while not overwhelming the heat exchanger.

For example, when the aircraft is cruising, the outflow valve can be opened to regulate the interior pressure of the aircraft. In such a configuration, air can flow through the heat exchanger and provide cooling airflow for the liquid coolant flow paths of the outflow valve. Coolant can then be flowed through the coolant flow paths to cool electronics. However, the flow rate of the coolant can be changed in response to outside ambient temperature. If the ambient temperature is hot, the heat exchanger and/or base can dissipate less heat than if the ambient temperature is cold and, thus, the coolant flow rate can be lowered for hot ambient temperatures.

In another example, the aircraft can be descending. As the outside air pressure increases at lower elevations, the outflow valve can be closed to increase the relative interior pressure of the aircraft. Due to the lack of airflow through the heat exchanger, the rate of coolant flow can be limited. However, in certain examples, cooling through outside airflow over the portion of the base of the outflow valve disposed on the exterior of the aircraft can provide sufficient cooling. In such an example, the controller can determine an appropriate amount of coolant to flow through the liquid coolant flow path.

In yet another example, the aircraft can be on the ground and/or taxiing. In such a situation, the outflow valve can be open to provide cooling airflow through the heat exchanger to provide sufficient cooling for the liquid coolant. Otherwise, the outflow valve can be closed, but due to low ambient outside temperatures, the exterior surface of the base can be cooled sufficiently by the low ambient temperature to provide sufficient cooling. However, if the ambient temperature is high and the outflow valve is required to be closed, the base can provide some cooling, but the electronics load or the maximum allowed electronics load of the aircraft can be reduced to limit increases in coolant temperature.

Depending on the determined coolant flow rate in block 612, coolant can accordingly be flowed through the liquid coolant flow paths in block 612. Additionally, temperatures of the electronics and/or the coolant can be monitored and the coolant flow rate and/or electronics load or maximum allowed electronics load can be accordingly adjusted in response to the determined temperatures.

Figure 7:
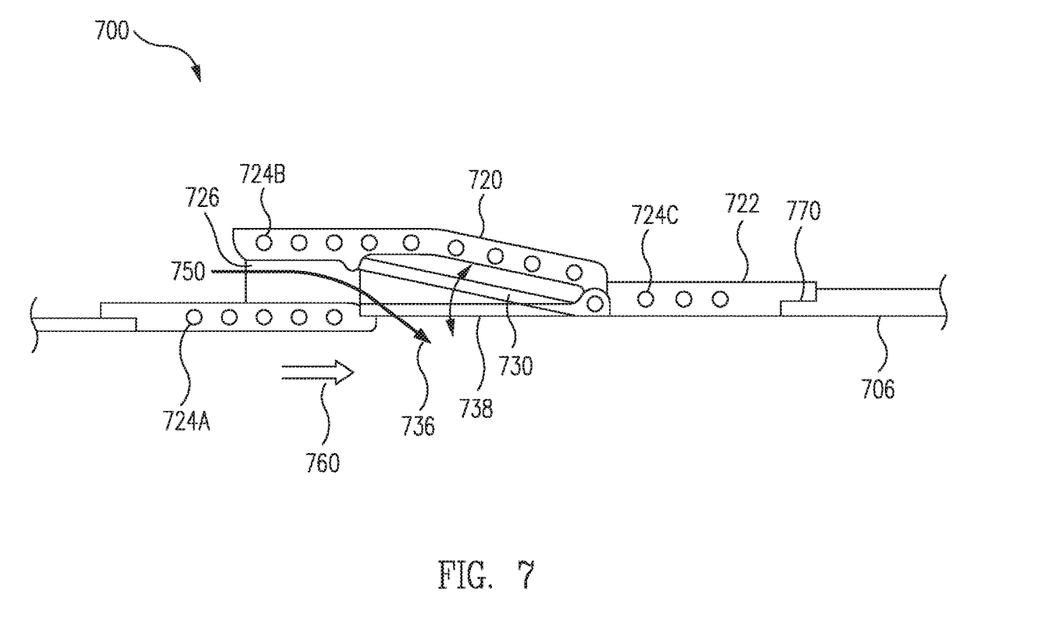
FIG. 7 illustrates a cutaway side view of a further integrated heat exchanger aircraft outflow valve in accordance with an example of the disclosure.

FIG. 7 illustrates a cutaway side view of a further integrated heat exchanger aircraft outflow valve in accordance with an example of the disclosure. Outflow valve 700 can include a heat exchanger 720, a base, and valve 730. The base can include base body 722 and can be configured to be coupled to fuselage 706 via any attachment technique described herein. Base body 722 and heat exchanger 720 can each include liquid coolant flow paths, such as liquid coolant flow paths 724A-C as well as other liquid coolant flow paths shown, but not labeled.

Heat exchanger 720 can be a section of outflow valve 700 offset from (e.g., not on the same plane as) base body 722 and, thus, allow for a gap between base body 722 and heat exchanger 720 that air can flow through. Such an air flow path, illustrated as air flow path 736, can allow for airflow 750 to flow through outflow valve 700 to control pressurization of an interior of the aircraft while allowing for airflow 750 to provide cooling airflow to outflow valve 700. Thus, heat from liquid coolant flow paths 724A-C can be transferred to base body 722 and heat exchanger 720 (e.g., through one or more fins 726). Airflow 750 can then cool base body 722 and heat exchanger 720 to reject such heat received from liquid coolant flow paths 724A-C.

In certain examples, fins 726 can be coupled to heat exchanger 720 and base body 722 and disposed within air flow path 736 to aid in cooling of heat exchanger 720 and base body 722 and, thus, coolant within liquid coolant flow paths 724A-C. Heat exchanger 720 can be a fixed portion of outflow valve 700 and, thus, at least partially define air flow path 736.

Valve 730 can move between an open position to allow for airflow 750 through opening 738 and a closed position to prevent airflow through opening 738. Valve 730 can move by translation, rotation, or other movements as described herein. As configured, airflow 750 can be provided into jet stream 760 in a manner and/or direction that allows for thrust recovery (e.g., contributes to thrust of the aircraft).

In certain examples, thermal insulator 770 can be disposed between base body 722 and fuselage 706. Thermal insulator 770 can be any type insulator that reduces heat transfer between two bodies. Thermal insulator 770 can reduce heat transfer between base body 722, and other portions of the outflow valve, and fuselage 706. Such insulation may, for example, reduce heating of fuselage 706, which can improve reliability and performance of, for example, composite fuselages.

Figure 8:
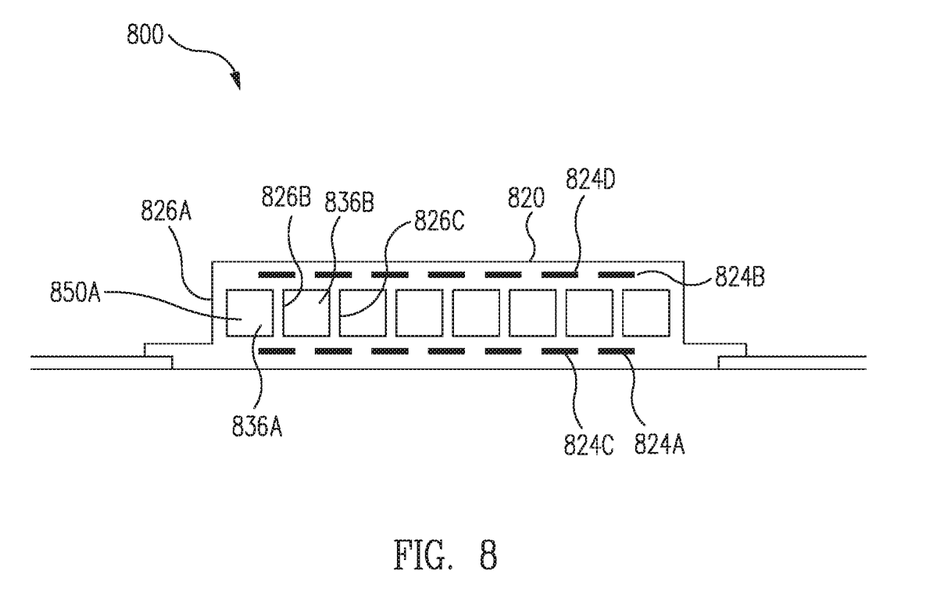
FIG. 8 illustrates a view of a further integrated heat exchanger of an aircraft outflow valve in accordance with an example of the disclosure.

FIG. 8 illustrates a view of a further integrated heat exchanger of an aircraft outflow valve in accordance with an example of the disclosure. FIG. 8 illustrates portions of outflow valve 800 that includes heat exchanger 820.

Heat exchanger 820 can include fins 826A-C, and other fins, as well as liquid coolant flow paths 824A-D. Air flow paths, such as air flow paths 836A and 836B, can be disposed between the fins 826A-C. Disposing liquid coolant flow paths adjacent to fins and air flow paths, as shown in FIG. 8, can result in more effective dissipation of heat from the liquid coolant while minimizing heat build-up within other portions of the outflow valve.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft outflow valve system comprising:
   a base configured to be coupled to a portion of an aircraft, the base comprising:
      a base body; and
      a coolant portion disposed within the base body and comprising a liquid coolant flow path;
   a heat exchanger coupled to the base and comprising an air flow path; and
   a valve coupled to the base body, the valve comprising:
      an opening disposed at an end of the air flow path; and
      a valve body configured to move between an open position and a closed position, wherein the open position is configured to allow air to flow through the opening and the closed position is configured to block air from flowing through the opening.

2. The aircraft outflow valve system of claim 1, further comprising a pressure regulator coupled to the valve body and configured to control a position of the valve body.

3. The aircraft outflow valve system of claim 1, wherein the heat exchanger further comprises a cooling fin thermally coupled to the base and defining at least a portion of the air flow path.

4. The aircraft outflow valve system of claim 3, further comprising a plurality of cooling fins arranged to direct the air to flow in a direction that provides thrust recovery.

5. The aircraft outflow valve system of claim 1, wherein the liquid coolant flow path is configured to be coupled to a liquid cooling circuit of the aircraft.

6. The aircraft outflow valve system of claim 1, wherein a portion of the base is configured to be disposed on an outer surface of the aircraft.

7. The aircraft outflow valve system of claim 6, wherein the base comprises:
   a first side configured to be disposed on the outer surface of the aircraft;
   a second side configured to be disposed within an interior of the aircraft; and
   a cooling fin disposed on the first side on the outer surface of the aircraft.

8. The aircraft outflow valve system of claim 1, wherein an entry of the liquid coolant flow path is disposed closer to an exit of the air flow path than an exit of the liquid coolant flow path, and wherein the exit of the liquid coolant flow path is disposed closer to the portion of the aircraft than the entry of the liquid coolant flow path.

9. The aircraft outflow valve system of claim 1, wherein the base is configured to be mechanically attached to the portion of the aircraft and configured to be removable for maintenance and reinstallation.

10. The aircraft outflow valve system of claim 1, wherein the aircraft outflow valve system is configured to regulate a cabin pressure of an aircraft.

11. The aircraft outflow valve system of claim 1, wherein the liquid coolant flow path comprises a coolant inlet and a coolant outlet, and wherein the coolant inlet is disposed interior of the coolant outlet within the base.

12. An aircraft comprising the aircraft outflow valve system of claim 1, wherein the aircraft further comprises:
   a fuselage, wherein the aircraft outflow valve system is coupled to the fuselage; and
   a wing.

13. The aircraft of claim 12, further comprising an electronics bay, wherein the liquid coolant flow path is coupled to a coolant line disposed through the electronics bay, and wherein the aircraft outflow valve system is located proximate the electronics bay.

14. The aircraft of claim 12, further comprising:
   a controller communicatively coupled to the aircraft outflow valve system, wherein the controller is configured to:
      determine a desired valve position; and
      cause the valve to move to the desired valve position.

15. The aircraft of claim 14, wherein the liquid coolant flow path is a first liquid coolant flow path, wherein the base further comprises a second liquid coolant flow path, and wherein the controller is further configured to:
   cause a fluid to flow through the first liquid coolant flow path and/or the second liquid coolant flow path in response to the desired valve position.

16. The aircraft of claim 14, wherein the controller is further configured to:
   determine a maximum electronic load of the aircraft in response to the desired valve position.

17. The aircraft of claim 14, further comprising an outside temperature sensor, wherein the controller is further configured to:
   determine an outside air temperature with the outside temperature sensor; and
   determine a flight condition of the aircraft, wherein the desired valve position is determined in response to the outside air temperature and/or the flight condition of the aircraft.

18. A method comprising:
   causing a fluid to flow through a liquid coolant flow path of a coolant portion of a base of an aircraft outflow valve, wherein the base is coupled to a heat exchanger comprising an air flow path;
   determining a desired valve position of a valve body configured to move between an open position allowing air to flow through the air flow path and through an opening of the aircraft outflow valve and a closed position preventing air from flowing through the opening of the aircraft outflow valve; and
   moving the valve body to the desired valve position.

19. The method of claim 18, further comprising determining a maximum electronic heat load of an aircraft in response to the desired valve position.

20. The method of claim 18, further comprising:
   determining an outside air temperature of an aircraft with an outside temperature sensor; and
   determining a flight condition of the aircraft, wherein the desired valve position is determined in response to the outside air temperature and/or the flight condition of the aircraft.

* * * * *